United States Patent
Leischner et al.

[11] Patent Number: 5,880,401
[45] Date of Patent: Mar. 9, 1999

[54] PLASTIC HOUSING OF THE FLAMEPROOF ENCLOSURE IGNITION PROTECTION TYPE

[75] Inventors: Manfred Leischner, Künzelsau; Bernd Limbacher, Schwabisch Hall; Dieter Pilz, Neuenstein, all of Germany

[73] Assignee: R. Stahl Schaltgeräte GmbH, Germany

[21] Appl. No.: 915,830

[22] Filed: Aug. 21, 1997

[30] Foreign Application Priority Data

Aug. 28, 1996 [DE] Germany .................. 196 34 673.8

[51] Int. Cl.⁶ .................................................... H05K 5/03
[52] U.S. Cl. ................................... 174/17 CT; 174/66
[58] Field of Search .................. 174/50, 66, 17 CT; 220/3.8, 241, 3.92, 3.94, 4.02

[56] References Cited

U.S. PATENT DOCUMENTS

| | | | |
|---|---|---|---|
| 3,149,747 | 9/1964 | Burgess | 220/4.02 |
| 3,724,706 | 4/1973 | Slocum | 220/3.8 |
| 3,910,448 | 10/1975 | Evans et al. | 174/50 X |
| 4,632,269 | 12/1986 | Rose | 220/3.8 |
| 4,664,281 | 5/1987 | Falk et al. | 220/3.8 |
| 4,699,293 | 10/1987 | Duchrow | 220/3.8 X |
| 4,873,600 | 10/1989 | Vogele | 174/50 X |
| 5,382,752 | 1/1995 | Reyhan et al. | 174/50 |
| 5,522,577 | 6/1996 | Roesch | 248/906 X |
| 5,621,189 | 4/1997 | Dodds | 174/50 |

FOREIGN PATENT DOCUMENTS

| | | |
|---|---|---|
| 17 68 265 | 6/1958 | Germany . |
| 29 21 361 | 12/1980 | Germany . |
| 36 12 975 | 11/1986 | Germany . |
| 36 19 051 | 12/1987 | Germany . |
| 6188577 | 7/1994 | Japan ............... 174/50 X |
| 384670 | 2/1965 | Switzerland .......... 174/66 X |
| 1086373 | 10/1967 | United Kingdom ..... 174/50 X |
| 2280994 | 2/1995 | United Kingdom ..... 174/17 CT |

*Primary Examiner*—Dean A. Reichard
*Attorney, Agent, or Firm*—Nilles & Nilles

[57] ABSTRACT

In a plastic housing of the "Flameproof Enclosure" ignition protection type, one part of the housing is provided at the parting plane with a rib (31) and the other housing part is provided with a groove complementary thereto. The cross-sectional dimensions of the groove are larger than the cross-sectional dimensions of the rib (31). The gap-like space obtained thereby is filled with a coating which adheres integrally either to the rib (31) or to the walls (14, 15) of the groove (13). This gives rise, between the coating and the other part to which it does not adhere integrally, to a gap which meets the requirement placed on an "ex-gap" of a flameproof housing.

19 Claims, 5 Drawing Sheets

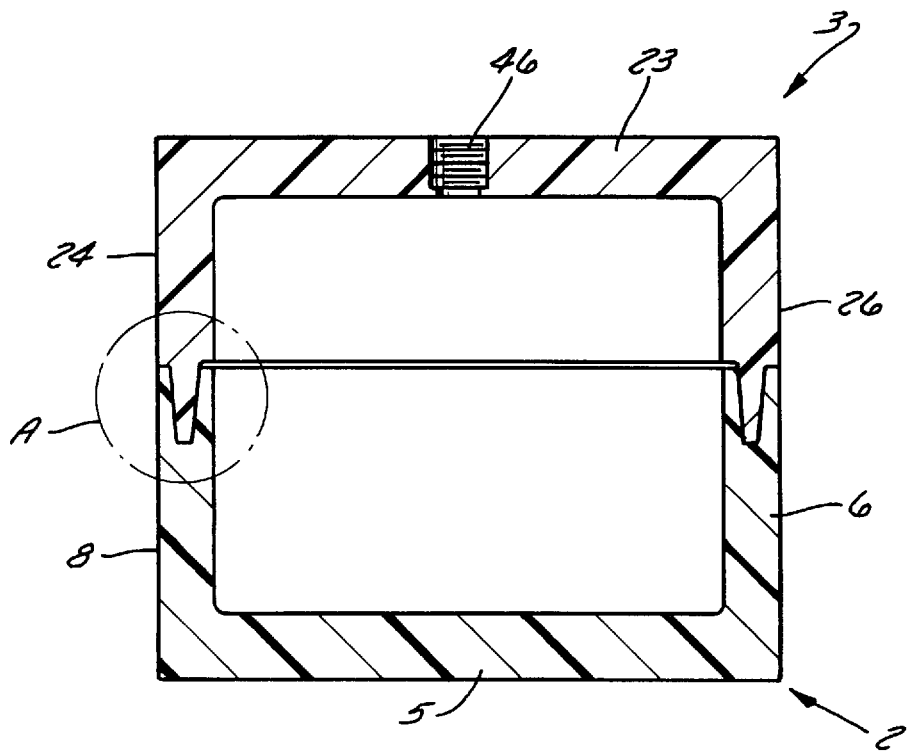
FIG. 3
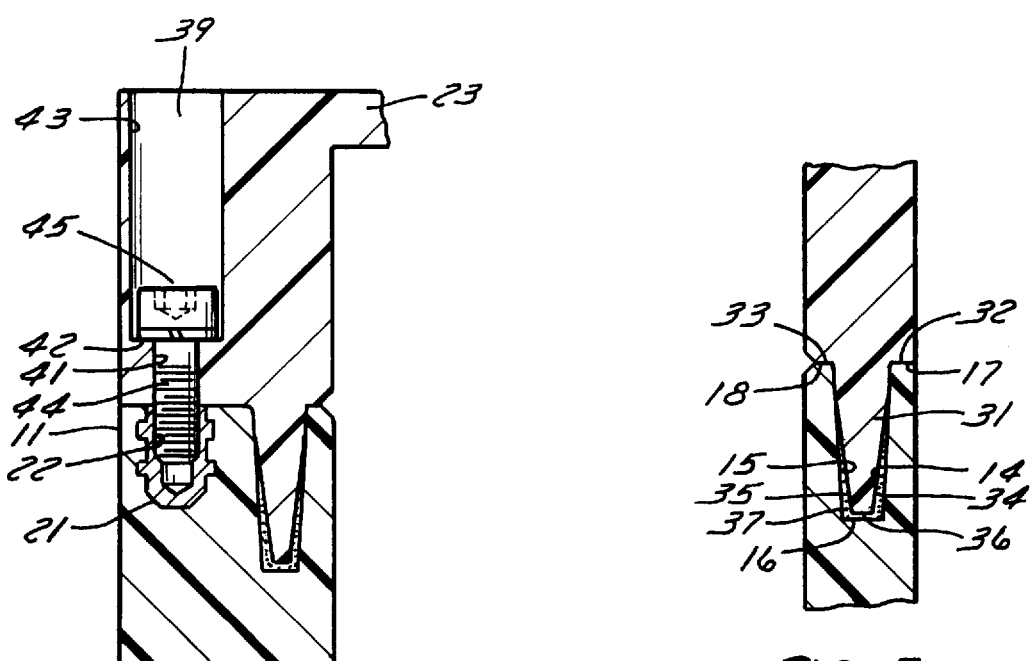
FIG. 4
FIG. 5

PLASTIC HOUSING OF THE FLAMEPROOF ENCLOSURE IGNITION PROTECTION TYPE

BACKGROUND OF THE INVENTION

The "Flameproof Enclosure" ignition protection type is a type of ignition protection, in which electric operating equipment and other appliances are accommodated in a closed housing. The housing must satisfy specific test conditions. It is necessary, inter alia, to ensure that, if an ignitable gas mixture ignites in the housing, no particles and no hot gases can escape outward which may possibly ignite the atmosphere in the vicinity of the housing, if an ignitable gas mixture is also present there. This condition relating to the retention of ignitable particles and hot gases can be achieved if the cover of the housing forms with the housing a so-called "ex-gap". During passage through the "ex-gap", the particles and gases are sufficiently cooled to be no longer capable of causing any damage outside the housing.

So that the "ex-gap" can perform its function, it must be sufficiently narrow and long, and the gap width should under no circumstances increase over time. In this case, in particular, the gap width is an essential criterion which, where large volumes are concerned, has hitherto been possible to adhere to sufficiently only by means of housings manufactured from metal. Housings injection-molded from plastic present the problem that the housing dimensions in the region of the parting plane between lower part and upper part of the housing and cover are subject to such pronounced material-related and process-related tolerances that it has not been possible to satisfy the conditions for an "ex-gap" there.

It has therefore been necessary hitherto, in the case of housings produced from plastic, to ensure the "Flameproof Enclosure" ignition protection type by connecting upper part and lower part of the housing integrally to one another at the parting plane by means of a sealing compound. However, the housing is consequently closed permanently and the electric operating equipment inside the housing can be reached only when the housing is destroyed.

OBJECTS AND SUMMARY OF THE INVENTION

Proceeding from this, the object of the invention is to provide a plastic housing of the "Flameproof Enclosure" ignition protection type which can be opened and closed as often as desired. Furthermore, the object of the invention is to specify a method for producing such a housing.

This object is achieved, according to the invention, by providing a flameproof housing having a first housing part and a second housing part which is detachably connected to the first housing part and which, when connected to the first housing part, delimits an enclosed housing interior. A parting plane, formed between the first and second housing ports, forms an ex-gap which extends from the housing interior to a housing exterior and defines a path through which matter must pass in order to escape from the housing in the event of an explosion within the housing. The parting plane includes a first parting plane face formed on one of the housing parts and a second parting plane face cooperating with the first parting plane face in a closed position of the housing and formed on the other of the housing parts. A coating is bonded integrally to one of the parting plane faces and has a free face which represents a negative cast of the other parting plane face. In the closed position of the housing, the coating fills a space between the first and second parting plane face. At least a substantial portion of the ex-gap is formed between the free face of the coating and the other parting plane face. The housing can be opened and closed without damaging the coating.

With the aid of the coating which essentially fills the gap-like space present per se in the parting plane of the housing, conditions whereby the parting plane becomes an "ex-gap" may be afforded. The dimensional tolerances in the region of the parting plane, which are unavoidable in the manufacture of the housing parts, are compensated completely by the coating subsequently introduced. Irrespective of the dimensions of the parting plane faces at the parting plane, the free face of the coating is always an exact negative image of the contour of the other face, cooperating therewith, of the other housing part.

In this case, it is unimportant for the implementation of the invention whether the parting plane face is a straight face, in the sense that the generatrix is a straight line, or whether the generatrix of the parting place face is V-shaped or U-shaped, so that the parting plane face is formed by the walls and the bottom of a groove or by the walls and the end face of a rib or strip. Only during production do slight deviations occur, inasmuch as one embodiment may necessitate special sealing means, in order to prevent the penetration of the liquid medium forming the coating, or not. In the case of an appropriate design, a groove-shaped parting plane face is, in any event, essentially gutter-shaped and automatically prevents the liquid coating medium from penetrating inside the housing during production.

Under certain circumstances, it may even be expedient to produce this coating on at least one of the housing parts by using a preform and, if appropriate, to use a complementary preform for the other housing part and to produce a further coating on the other housing part. The housing parts thus produced may then be paired in any way desired, on the precondition that the two preforms fit exactly in one another so as to satisfy the conditions for "ex-gaps".

For example, in the case of a coating seated on a tongue or rib, the outer contour of the coating represents the exact negative copy of the groove wall of the other housing part. Since this coating is applied after the curing and cooling and, if appropriate, also after the artificial aging of the plastic housing parts, it is essentially stress-free, that is to say its outer shape will not change over time, with the result that the joining point or parting plane between the housing parts will permanently satisfy the conditions of the "ex-gap". The coating subsequently applied does not change the shape either of the groove or of the rib and, since it cures when the housing is in the closed state, no stresses occur in the parting plane even during later use.

In the new housing, both the housing upper part and the housing lower part may contain the groove at the parting plane, whilst the other housing part in each case is provided at the parting plane with the rib which projects into the groove. It is likewise unimportant for the basic principle whether the coating is integrally connected to the wall of the groove or to the wall of the rib.

The coating is composed of a compound which is flowable at the time of application, that is to say it must be capable, when the rib is pressed into the groove, of flowing into the gap-like space present between the groove and the rib. In this case, "flowability" does not necessarily mean liquid, so that the compound commences to flow by itself on account of gravity. To that extent, pasty materials also satisfy the "flowable" condition.

A compound of this type, which does not flow away by itself, is expedient, for example, when, for any other reasons of design, the groove does not form a gutter lying in one plane, but has steps and level differences.

In order to prevent the coating from inadvertently coming loose from that housing part on which the coating is to be seated integrally per se, it is advantageous if this respective part is, if appropriate, pretreated for a better adhesion of the coating. Such pretreatment may involve roughening, for example by sandblasting, or redox treatment or the application of an adhesion promoter.

In order to avoid any problems with the leakproofing of the housing, the housing screws, by means of which the housing parts are held together, are appropriately arranged in a region outside the region delimited by the groove.

In order to produce the new housing, there is provision for bringing the housing part having the groove into a position in which the groove is upwardly open. The groove is then filled with the flowable compound, whereupon the housing is closed. The flowable coating compound present in the groove is displaced by the rib being introduced and thereby rises in the gap-like space between the rib and the side walls. In order to avoid overflowing the groove, the quantity of flowable compound is expediently dimensioned in such a way that such overflow phenomena do not occur after the housing has been closed.

BRIEF DESCRIPTION OF THE DRAWINGS

An exemplary embodiment of the subject of the invention is illustrated in the drawing in which:

FIG. 3 shows the housing according to FIG. 1 in section along the line III—III according to FIG. 1, FIG. 4 shows a sectional detail of the housing according to FIG. 1, FIG. 5 shows an enlarged illustration of the detail from FIG. 3 which is designated by A.

DESCRIPTION OF THE PREFERRED EMBODIMENTS

Figure 1:
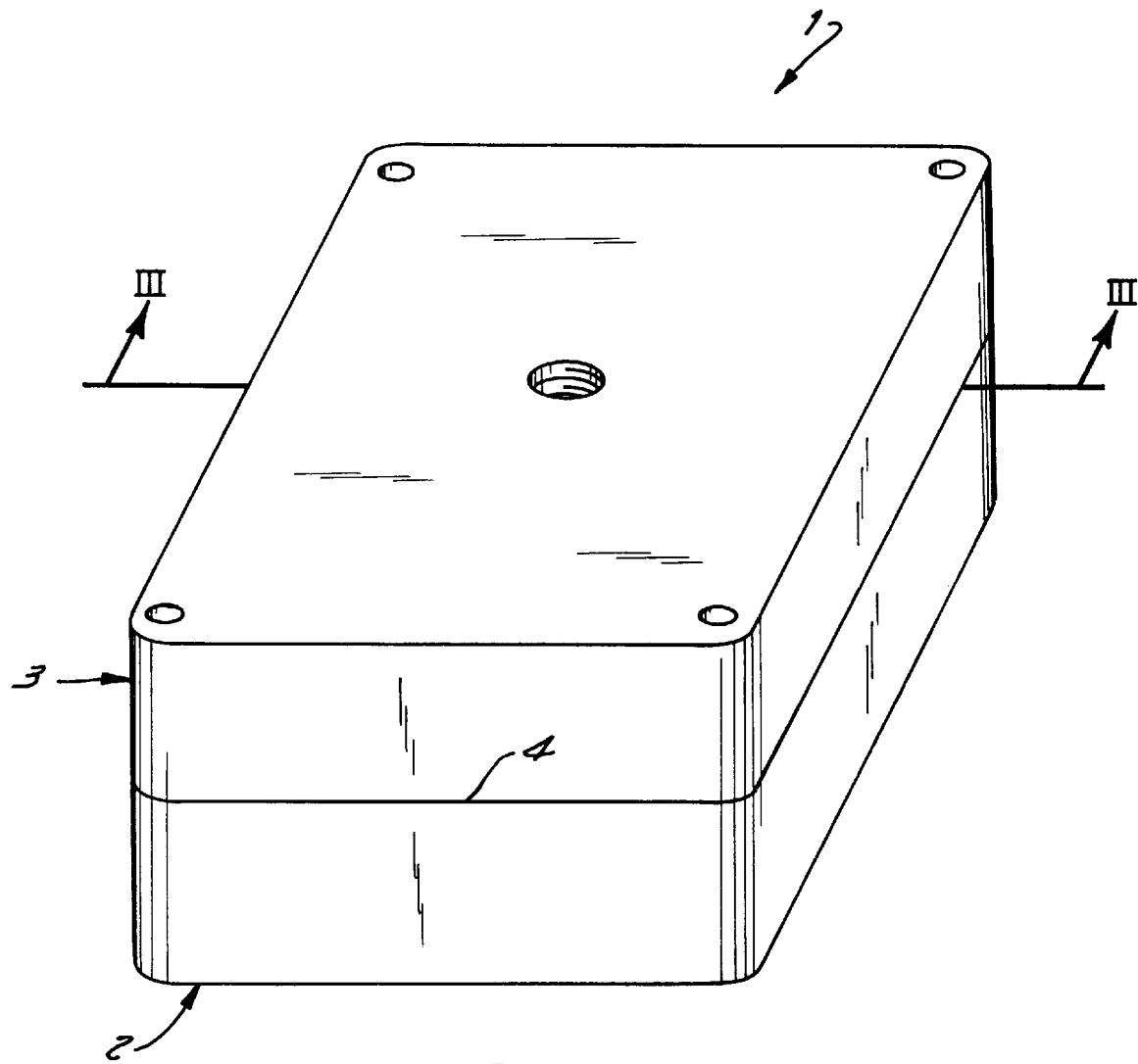
FIG. 1 shows a plastic housing of the "Flameproof Enclosure" ignition protection type which is produced from duroplastic.
Figure 2:
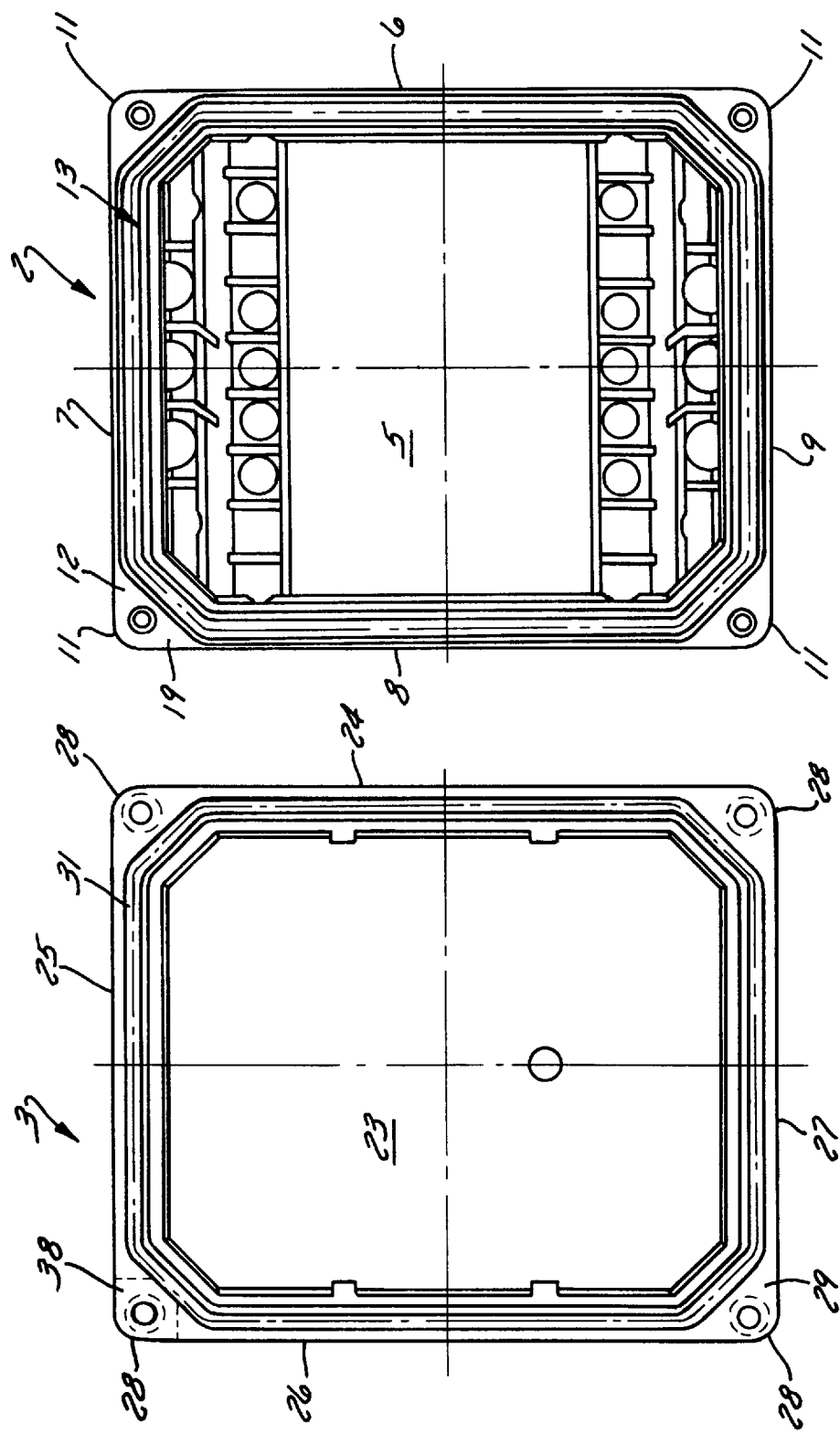
FIG. 2 shows the upper and the lower part of the housing according to FIG. 1, in each case in a top view of the parting plane.

FIG. 1 shows an approximately parallelepipedic plastic housing 1 which has a design of the "Flameproof Enclosure" ignition protection type. The housing 1 is composed of a housing lower part 2 and of a housing upper part 3. In the exemplary embodiment shown, the housing lower part 2 and the housing upper part 3 are approximately dish-shaped or bowl-shaped and joined together at a parting plane 4 which runs around the circumference of the housing 1.

The flameproof housing 1 is reproduced in a greatly simplified manner in FIG. 1, inasmuch as all the things which are not essential for understanding the invention are omitted. These include, for example, cable leadthroughs, external terminals of the "Increased Safety" ignition protection type, and the like.

The dish-shaped or bowl-shaped housing lower part 2 is delimited by a bottom 5 and altogether four side walls 6, 7, 8 and 9 which project upward from the bottom 5 and which both are in one piece with the bottom 5 and merge into one another in one piece at rounded corner edges 11. At their end remote from the bottom 5, the four side walls 6, 7, 8 and 9 are delimited at the same height by a rectangular face 12 lying in one plane. This face 12 is that part of the parting plane 4 which is seated on the housing lower part 2.

Starting from the flat annular face 12 which delimits the interior of the housing lower part 2, a continuous groove 13 closed on itself is worked into the side walls 6 to 9, as may be seen in FIGS. 3 and 5. This groove is a further integral part of the parting plane 4. The groove 13 is delimited by walls in the shape of two groove flanks 14 and 15 and an essentially flat groove bottom 16. The groove flanks 14, 15 form, together with the groove bottom 16, a first parting plane face which, when the housing is closed, constitutes one of the walls of the ex-gap. The first parting plane face is folded in a U-shaped or V-shaped manner, as seen longitudinally, that is to say its generatrix is a line bent in a U-shaped or V-shaped manner.

As a result of the groove 13, the annular face 12 is divided into two annularly closed faces 17 and 18 concentric relative to one another. The two groove flanks 14 and 15 are straight faces, in the sense that their generatrix is a straight line, and, moreover, the two groove flanks 14 and 15 converge, starting from the face 13, in the direction of the groove bottom 16. The groove 13 is free of any undercuts.

The groove 13 thus has an approximately trapezoidal cross section and forms a gutter which is closed on itself and which lies in one plane, in the sense that points along the groove which correspond to one another lie in each case in one plane. Thus, for example, all the points of the groove bottom 16 lie in one plane which is parallel to the two part faces 17 and 18, the groove 13 consequently having the same depth at all points.

In its run, though, groove 13 does not exactly follow the outer contour of the housing lower part 2. It is markedly set back relative to the outer contour in the region of the corner edges 11, so that approximately triangular regions 19 are obtained. As may be seen in FIG. 4, threaded bushes 21 are injection-molded in these triangular regions 19. These threaded bushes 21 are located outside the face delimited by the groove 13 closed on itself. The threaded bushes 21 contain a threaded bore 22, the axis of which is parallel to the corner edge 11.

The housing upper part 3 has a design which is essentially identical to the design of the housing lower part 2. Thus, the housing upper part 3 is formed by a top side 23 and four side walls 24, 25, 26, 27 which are in one piece with the top side 23 and which merge into one another in one piece at rounded corner edges 28. At their end remote from the top side 23, the side walls 24 to 27 are delimited by a flat annular face 29 which belongs to that part of the parting plane 4 located on the housing upper part 3 and which, when the housing 1 is closed, is congruent with the annular flat face 12.

In contrast with the annular face 12, the annular face 29 is provided with a rib 31, as may be seen in FIG. 5. This rib 31 too is part of the parting plane 4, and it rises out of the annular face 29, with the result that the annular face 29 is divided into two annular faces 32 and 33 concentric relative to one another. The rib 31, which is endlessly closed on itself, is delimited by walls in the shape of two lateral flanks 34 and 35 and an end face 36. The two lateral flanks 34 and 35 are straight faces, in the sense that their generatrix is a straight line. They converge, starting from the annular face 29, in the direction of their end face 36. The rib 31 thereby acquires a trapezoidal cross section.

The lateral flanks 34, 35 form, together with the end face 36, a second parting plane face which, when the housing is closed, constitutes the other wall of the ex-gap. The second parting plane face is folded in a U-shaped or V-shaped manner, as seen longitudinally, that is to say its generatrix is a line bent in a U-shaped or V-shaped manner.

The position of the rib 31 on the housing upper part 3 is such that, when the housing 1 is closed, the rib 31 penetrates into the groove 13. Moreover, the cross section of said rib is smaller than that of the groove 13, as a result of which there remains between the walls, that is to say the flanks 14 and 15 and the bottom 16, of the groove 13 and the walls, that is to say the flanks 35 and 34 and the end face 36, of the rib 31 a gap-like free space which is approximately U-shaped, as seen in cross section. This gap-like free space has a thickness, measured perpendicularly between the flanks 15 and 35 and 14 and 34 respectively, of between 0.5 mm and 1.5 mm, if appropriate even up to 4 mm. In the finished housing 1, the gap-like free space is essentially filled with a dimensionally stable coating 37 which adheres integrally either to the walls 14, 15 and 16 of the groove 13 or to the walls 34, 35 and 36 of the rib 31.

Before the method for applying the coating 37 is discussed in detail, it may also be mentioned, for the sake of completeness, that the housing upper part 3, too, has, in the vicinity of the corner edges 28 triangular regions 38, on which the rib 31 is set back relative to the corner edge 28. This triangular region 38 contains, at each corner edge 28, a stepped bore 39 which, when the housing 1 is closed, is in line with the threaded bore 22. The stepped bore 39 is composed of a portion 41 of smaller diameter which merges at an annular shoulder 42 into a portion 43 of larger diameter. The diameter of the portion 41 is selected in such a way that a threaded shank 44 of a headed screw 45 fits through with negligible play, whilst the portion 43 of larger diameter is somewhat larger than the head of the headed screw 45. In the instance shown, therefore, the housing 1 has four screws 45 which fasten the housing upper part 3 to the housing lower part 2.

Finally, the top side 23 also contains a test bore 46 which is conventional in housings of the "Flameproof Enclosure" ignition protection type.

Figure 6:
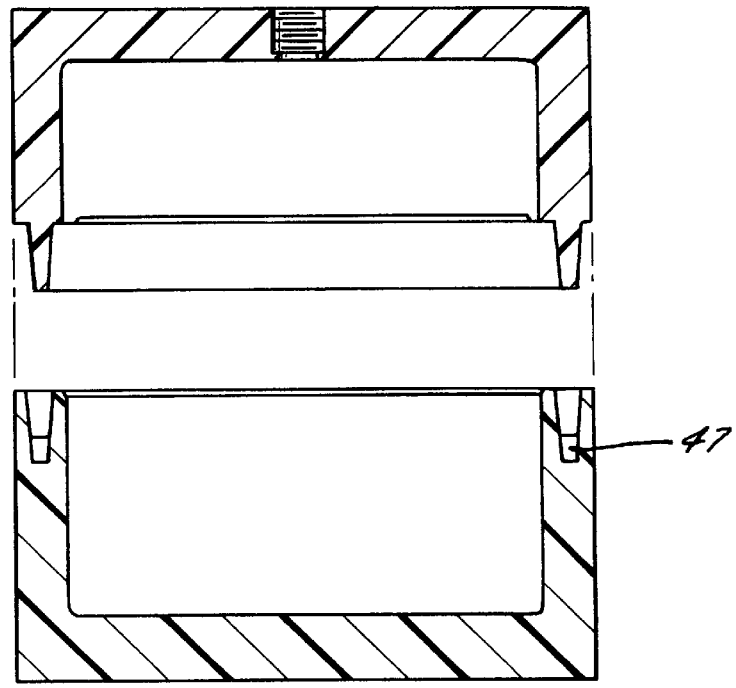
FIG. 6 shows steps during the production of the housing according to FIG. 1.

The production of the explosion-proof housing 1 is described below with reference to FIG. 6:

A housing lower part 2 and a housing upper part 3 are first produced by the injection molding method. These housing parts 2, 3 are allowed to cool completely and, if appropriate, are subjected to an artificial aging process, in order to avoid a subsequent contraction of the housing dimensions.

Before the coating 37 is produced, the flanks 34 and 35 and the end face 36 are pretreated in such a way that the material of the coating 37 can bind integrally with the rib 31. Pretreatment may comprise roughening of the surface, coating with an adhesion promoter or redox treatment of the surface.

The flanks 14 and 15 and the bottom 16 of the groove 13 are subsequently provided with a parting medium, for example a silicone oil.

After this preparatory work, a housing lower part 2 is placed with its bottom 5 onto a flat base in the way shown. A metered quantity of a flowable synthetic resin, for example an epoxide resin or a polyester resin, polyurethane, is subsequently introduced into the groove 13. This introduced flowable synthetic resin is illustrated at 47. The quantity of synthetic resin 47 introduced corresponds to the volume of the gap-like free space between the rib 31 and the groove 13. The introduced quantity will consequently fill only the lowest region of the groove 13.

After the flowable synthetic resin compound has been introduced into the groove 13, the housing upper part 3 is placed onto the housing lower part 2, specifically in exactly the same position which these two housing parts 2, 3 are subsequently to assume relative to one another, that is to say, if possible, in such a way that the rib 31 is located approximately centrally in the groove 13 at all points. In other words, the aim is to ensure that at no point is there any direct contact between the groove 13 and the rib 31. The depth of penetration of the rib 31 into the groove 13 is limited by the coming of the faces 29 and 12 to bear on one another.

As a result of the penetration of the rib 31 into the groove 13, the flowable plastic compound 47 contained in the groove 13 is displaced and fills the gap-like free space predetermined as a consequence of construction between the flanks of the groove 13 and the flanks of the rib 31. The flowable plastic 47 thus rises upward in this space in the direction of the face 12.

In order to ensure that the parting plane 4 is also reliably closed relative to the outside and that the housing upper part 3 under no circumstances floats on the flowable plastic 47, the housing 1 is screwed together by means of the screws 45, if no other device is available. This closed state of the housing 1 is maintained until the plastic compound 47 is reliably cured. After curing has taken place, the housing parts 2, 3 associated with one another are marked as belonging together and the screws 45 are unscrewed in order to open the housing 1. During opening, the dimensionally stable coating 37 remains on the rib 31, that is to say one side of the coating 37 is bound integrally with the outside of the rib 31, whilst the other side of the coating 37, which faces away from the rib 31, represents a faithful exact negative image or negative cast of the inner contour of the groove 13. Since this operation takes place on the finished housing and the plastic compound 47 was flowable at the commencement of the procedure, no bursting effects occur in the groove 13 when the housing is closed once again.

On account of the exact cast of the groove 13 taken by the coating 37, a "gap", which satisfies the conditions of the "ex-gap", is produced between the housing upper part 2 and the housing lower part 3 at the parting plane 4. Even if deviations in shape on the groove 13 and the rib 31 occur as a consequence of fluctuating process temperatures during the injection molding of the housing parts 2, 3 and varying contraction, these deviations are compensated completely by the coating 37. Irrespective of the production tolerances, an "ex-gap" between the groove 13 and the outside of the coating 37 is always brought about after the coating 37 has been applied.

In the exemplary embodiment described, it was assumed that the coating adheres integrally to the rib 31 and therefore to the second parting plane face. However, it is also readily possible to use the coating as a lining of the groove 13 and consequently on the first parting plane face, whilst the rib can part from the coating 37. In this case, the rib 31 is treated with the parting medium, whilst the walls 14, 15 and 16 of the groove are pretreated in such a way that an integral bond is made between the material of the housing part 2, 3, containing the groove 13, and the flowable plastic compound 47.

In contrast to the essentially flat parting plane 4 shown, complicated other shapes in the run of the parting plane 4 are also conceivable. For example, it will be conceivable for the parting plane to have a stepped design. In such a case, a plastic compound 47 which is not thinly liquid, but pastily flowable, is used. It will not flow away under the influence of gravity and therefore remains at the desired point even in oblique regions of the parting plane. Only by putting in place and pressing in the housing part having the rib will the plastic compound 47 be forced into the gap-like free space and spread.

Figure 7:
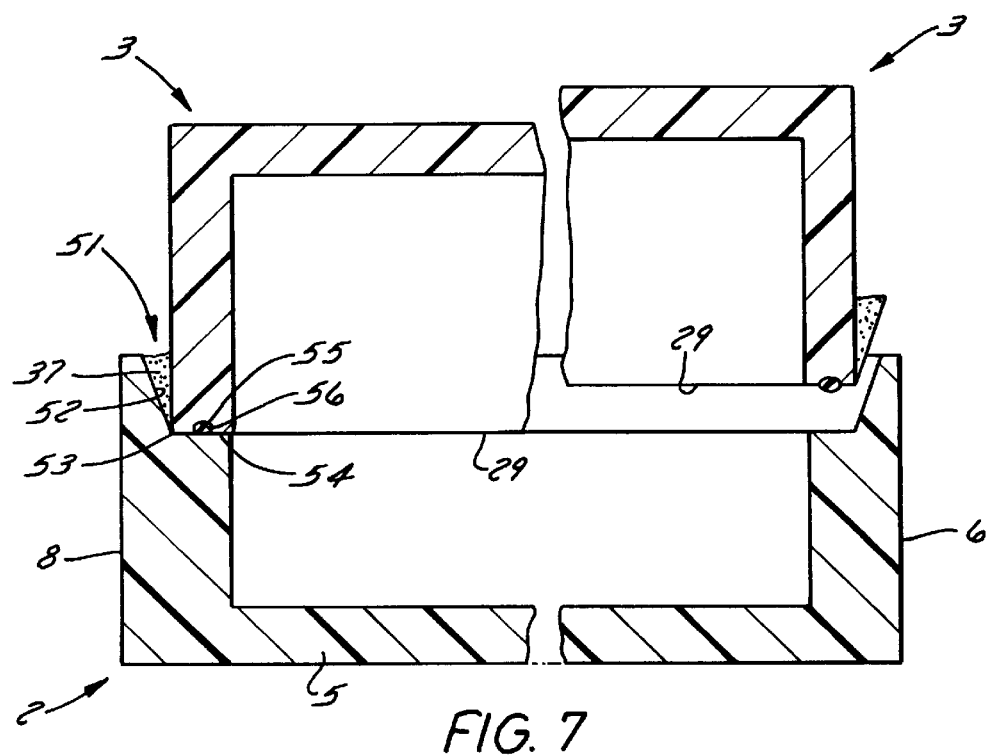
FIG. 7 shows an embodiment in which a groove for receiving the liquid compound is present in none of the housing parts, in a longitudinal section and in two different relative positions of the housing parts.

In the exemplary embodiment explained previously with reference to FIGS. 1 to 6, the first parting plane face was composed of walls and the bottom of a groove, whilst the second parting plane face was formed by the flanks and the end face of a rib. This embodiment has the advantage of relatively very simple production. As shown in FIG. 7, it is in no way necessary for the first parting plane face to have a groove-like shape. It may also be formed, as it were, by the walls of a halfgroove. According to FIG. 7, the lower part 5 does not contain a complete groove in the side walls 6, 7, 8, 9 at their upper end, but only a step 51 open toward the inside. This step 51 is composed of a straight oblique face 52 which starts from the annular face 12 and merges, at 53, into a flat annular shoulder 54 which runs around along all the side walls 6, 7, 8, 9, in the same way as the side face 52. As shown, the side face 52 is inclined, that is to say, in the broadest sense, it forms a cutout of a funnel pointing toward the bottom 5.

The housing upper part 3 is completely flat and smooth on its annular or end face 29, with the exception of a groove 55, into which a toroidal sealing ring 56 is inserted. The outer dimensions of the housing upper part 3 are such that, as shown, it can be placed with its end face 29 onto the shoulder 54, without thereby colliding with the side wall 52. FIG. 7 shows the closed housing on the left side, and, as may be seen there, the oblique side face 52 forms, together with a short portion of the shoulder 54 and that region of the side walls 24, 25, 26, 27 of the housing upper part 3 which is located opposite the oblique side face 52, a V-shaped groove which is upwardly open. In the finished housing, this groove is filled with a coating 37.

The housing according to FIG. 7 is produced as follows:

The housing parts 2 and 3 are produced in the way described above. One housing part is then treated with a parting medium on the side face 52 and on the shoulder 54. The housing upper part 3 is prepared on its outside, in the region located opposite the side wall 52, in such a way that the coating 37, in the cured state, makes an integral bond with the housing upper part 3. The sealing ring 56 is then inserted into the groove 55 which is present if appropriate, and, as shown on the left side in FIG. 7, the housing upper part 3 is placed into the housing lower part 2 and is pressed with the face 29 against the shoulder 54 by means of measures which cannot be seen, in order to obtain a leakproof closure. A preferably thinly liquid synthetic resin is subsequently introduced into the upwardly and outwardly open groove formed between the housing upper part 3 and the housing lower part 2. The plastic compound is allowed to react until it is cured completely. The housing can subsequently be opened again. After curing, the plastic compound introduced forms the coating 37, already described, which adheres firmly to the outside of the housing upper part 3. FIG. 7 shows the opened state of the housing on the right side.

The coating 37 thus applied to the housing upper part 3 represents an exact negative cast of the side wall 52. In the closed state, the side wall 52, together with the adjacent face of the coating 37, forms the "ex-gap" conforming to regulations.

The plastic housing 1 according to FIG. 7 can be opened and closed as often as desired in the same way as the housing according to FIGS. 1 to 6.

Since FIG. 7 shows only those differences from the previous exemplary embodiment which are essential to the invention, it does not also show the fastening means which are obviously present and which serve for holding the housing 1 in the closed position.

If the anchoring of the coating 37 on the housing part to which it adheres integrally is to be further improved, it is also possible to arrange in the respective housing face corresponding structural elements, for example gutters and grooves, with or without an undercut, in which the coating 37 can be additionally anchored. By contrast, the other parting plane face, to which the coating 37 is not bonded integrally, remains free of such undercuts, so as not to impede the opening operation. The obliquity, shown in FIG. 7, of the side face 52 makes it easier to open and close the housing.

Figure 8:
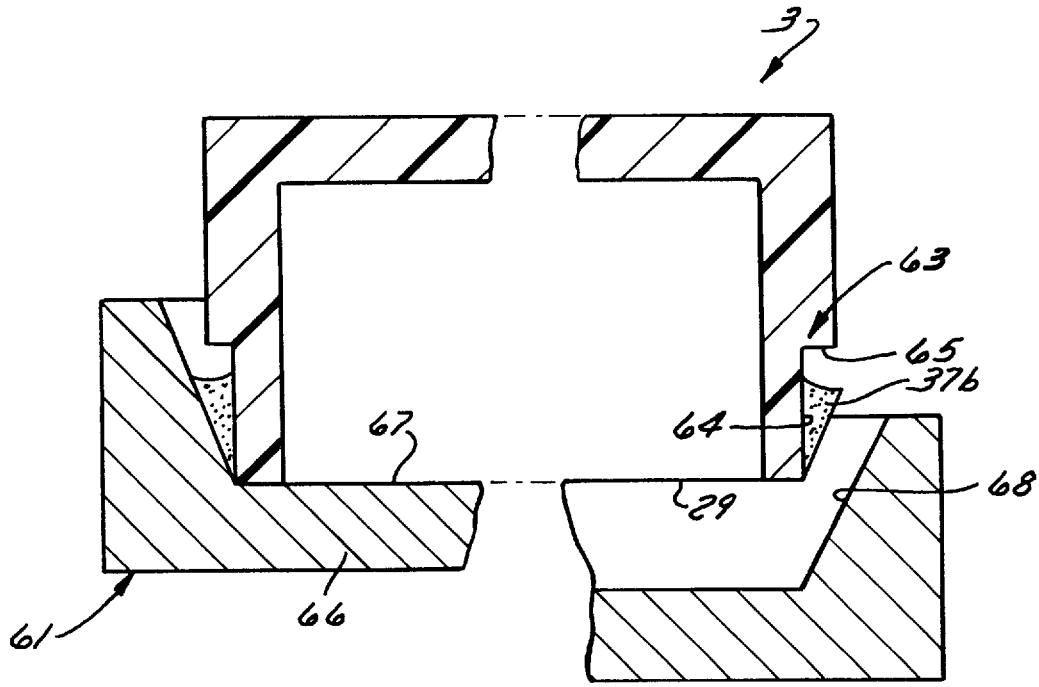
FIGS. 8 and 9 show an embodiment in which the housing parts are produced using preforms.
Figure 9:
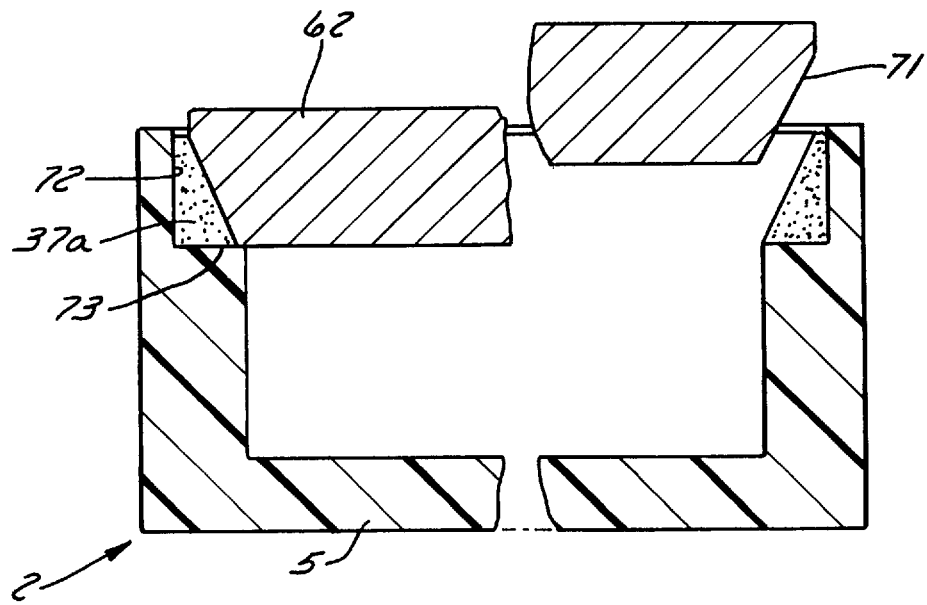

Finally, as shown in FIGS. 8 and 9, it is also possible to produce a coating 37a and 37b on each of the two housing parts by means of preforms 61 and 62.

Provided on the housing upper part 3 is a rabbet or setback 63 which runs around the end face 29 and which is composed of a side face 64 leading to the end face 29 and of a shoulder 65 located above said side face. The preform 61, by means of which the coating 37b is applied, has the same shape as the upper end of the housing lower part 2 according to FIG. 7. It is composed of a flat bottom 66 with a flat top side 67, from which extends a peripheral wall arrangement 68 inclined obliquely outward. The wall arrangement 68 follows essentially the contour of the horizontal projection of the housing upper part 3.

The coating 37b is applied by placing the housing upper part 3 into the preform 61 according to the left side of FIG. 8. The groove delimited between the side wall arrangement 68 and the wall 64 is filled with a preferably thinly liquid synthetic resin compound, as shown at 69. This synthetic resin compound is allowed to react until it solidifies and has bonded integrally with the housing upper part. The housing upper part 3 is then lifted out of the preform 61, the coating 37b remaining adhering integrally to the housing upper part 3 and parting from the side wall arrangement 68 of the preform.

The preform 62 serves for producing the housing lower part 2, the preform having essentially the shape of a thick plate and being delimited laterally by a side wall arrangement 71. The side wall arrangement 71 fits exactly into the side wall arrangement 68 of the preform 61, specifically in such a way that, when the preform 62 is inserted into the preform 61, the two side wall arrangements 68 and 71 delimit a gap which satisfies the conditions of the "ex-gap".

The housing lower part 2 is provided, in the region of its end face 12, with an inwardly open rabbet which is delimited by a wall 72 perpendicular to the bottom 5 and by a shoulder 73.

To produce the coating 37a, the preform 62 is laid onto the shoulder 73 and retained there. An upwardly tapering groove of triangular cross section, together with the rest of the shoulder 73 and the wall 72, is thereby delimited. This groove is subsequently filled with a thinly liquid synthetic resin compound. After the groove has been filled, there is a wait until the synthetic resin compound has reacted. The preform 62 is subsequently taken out of the housing lower part 2, the coating 37a remaining adhering integrally to the housing lower part 2, specifically to the shoulder 73 and the wall 72.

The lifting out of the preform 62 is shown on the right side in FIG. 9.

Since the two preforms 61 and 62 have fitted one into the other to form an "ex-gap", after completion the housing upper part 3 and the housing lower part 2 will also fit together in such a way that the free faces of the coatings 37a and 37b rest one on the other to form an "ex-gap".

The manufacturing outlay for a housing according to FIGS. 8 and 9 is somewhat higher, since accurately prefabricated preforms 61 and 62 are required. In return, the method has the advantage that the housing upper parts and housing lower parts which are obtained can be paired with one another in any way desired.

In the case of a plastic housing of the "Flameproof Enclosure" ignition protection type, one part of the housing is provided at the parting plane with a first parting plane face, for example a groove, and the other housing part provided with a second parting plane face, for example a rib. The cross-sectional dimensions of the groove are larger than the cross-sectional dimensions of the rib. The gap-like space thereby obtained is filled with a coating which adheres integrally either to the rib or to the walls of the groove. This gives rise, between the coating and the other part to which it does not adhere integrally, to a gap which meets the requirement placed on an "ex-gap" of a flameproof housing.

We claim:

1. A plastic re-openable explosion-proof housing, the housing comprising:

a first housing part, a second housing part which is detachably connected to the first housing part and which, when connected to the first housing part, delimits an enclosed housing interior, a parting plane being formed between the first and second housing parts, the parting plane forming an ex-gap which extends from the housing interior to a housing exterior and which defines a path through which matter must pass in order to escape from the housing in the event of an explosion within the housing, the parting plane including 1) a first parting plane face formed on one of the housing parts and 2) a second parting plane face cooperating with the first parting plane face in a closed position of the housing and formed on the other of the housing parts, and a coating which is bonded integrally to one of the parting plane faces and which has a free face which represents a negative cast of the other parting plane face, wherein, in the closed position of the housing, the coating fills a space between the first and second parting plane face, wherein at least a substantial portion of the ex-gap is formed between the free face of the coating and the other parting plane face, and wherein the housing can be opened and closed without damaging the coating.

2. A plastic re-openable explosion-proof housing, the housing comprising:

a first housing parts, a second housing part which, together with the first housing part, delimits an enclosed housing interior, a parting plane being formed between the first and second housing parts, the parting plane forming an ex-gap which extends from the housing interior to a housing exterior and which defines a path through which matter must pass in order to escape from the housing in the event of an explosion within the housing, the parting plane including 1) a first parting plane face formed on one of the housing parts, and 2) a second parting plane face cooperating with the first parting plane face in a closed position of the housing and formed on the other of the housing parts, a first coating which is bonded integrally to the first parting plane face and which has a free face 1) facing away from the first parting plane face and 2) having a profile that at least substantially matches a profile of the first parting plane face, and a second coating which is bonded integrally to the second parting plane face and which has a free face 1) facing away from the second parting plane face and 2) having a profile that at least substantially matches a profile of the second parting plane face, wherein at least a substantial portion of the ex-gap is formed between the free faces of the first and second coatings, and wherein the housing can be opened and closed without damaging the first and second coatings.

3. The housing as claimed in claim 1, wherein the first parting plane face is folded in a U-shaped or V-shaped manner in a longitudinal direction of the parting plane, in such a way that the first parting plane face forms side walls and a bottom of a groove which runs in the longitudinal direction of the parting plane.

4. The housing as claimed in claim 1, wherein the second parting plane face is folded in a U-shaped or V-shaped manner in a longitudinal direction of the second parting plane face, in such a way that the second parting plane face forms side walls and an end wall of a rib which runs in the longitudinal direction of the second parting plane face.

5. The housing as claimed in claim 4, wherein the rib penetrates into a groove when the housing is closed.

6. The housing as claimed in claim 4, wherein the coating is bonded integrally to the side walls and the end wall of the rib.

7. The housing as claimed in claim 3, wherein the coating is bonded integrally to the side walls and the bottom of the groove.

8. The housing as claimed in claim 1, wherein the coating is composed of a curable compound.

9. The housing as claimed in claim 8, wherein the coating is composed of a synthetic resin selected from a group which consists of an epoxide resin, polyurethane, and a polyester resin.

10. The housing as claimed in claim 9, wherein the synthetic resin is liquid before curing.

11. The housing as claimed in claim 1, wherein the one parting plane face is roughened.

12. The housing as claimed in claim 1, wherein the one parting plane face is blasted.

13. The housing as claimed in claim 3, wherein the groove forms a gutter closed on itself.

14. The housing as claimed in claim 3, wherein the groove forms a gutter which lies in one plane.

15. The housing as claimed in claim 1, wherein threaded bores for screws are provided on one of the housing parts, and wherein passage bores aligned with the threaded bores are provided on the other housing part.

16. The housing as claimed in claim 15, wherein the threaded bores are located outside a region delimited by one of the parting plane faces.

17. The housing as claimed in claim 16, wherein the threaded bores are blind bores.

18. The housing as claimed in claim 1, wherein at least the other parting plane face is free of undercuts.

19. The housing as claimed in claim 1, wherein at least the other parting plane face has oblique flanks.

* * * * *